United States Patent Office 2,769,841
Patented Nov. 6, 1956

2,769,841

PRODUCTION OF ETHYLENE POLYAMINES

Stanley W. Dylewski, Harvey G. Dulude, and Glenn W. Warren, Midland, Mich., assignors to The Dow Chemical Company, Midland, Mich., a corporation of Delaware No Drawing. Application December 23, 1953, Serial No. 400,102

5 Claims. (Cl. 260—585)

This invention relates to the production of ethylene polyamines such as ethylenediamine and polyethylene polyamines from ethylene dichloride and ammonia. It pertains especially to an improved method which curtails, or prevents, formation of diethylenetriamine while permitting production of other, and at present more valuable, ethylene polyamines such as ethylenediamine and polyethylene polyamines higher than diethylenetriamine.

A method commonly employed for the production of ethylene polyamines is to react ethylene dichloride and ammonia by heating a mixture of ethylene dichloride and an aqueous solution of ammonia at elevated temperatures and pressures. Mnookin, in United States Patent No. 2,049,467, describes a procedure for making ethylene polyamines wherein ethylene dichloride and a dilute aqueous solution of ammonia are heated in admixture with one another under pressure at temperatures of from 120° to 300° C. The patent discloses that the reaction product is a mixture of ethylene polyamines in varying proportions, depending in part upon the proportion of water, the proportion of ammonia and the temperature used, and that by increasing the proportion of ammonia, larger proportions of lower polyamines are formed, and with reduced proportions of ammonia, larger proportions of higher amines tend to form.

Although the proportions of the various ethylene polyamines, all of which are obtained in each case by a reaction between ethylene dichloride and ammonia, can be varied by change in the proportions of reactants, or the reaction temperature employed, as stated in the patent, there are instances in which production of only certain of the ethylene polyamines is desired and production of one or more of the other ethylene polyamines normally formed in the reaction is not desired. For instance, diethylenetriamine is at present in over-supply, whereas there is considerable demand for ethylenediamine and for the higher polyethylene polyamines, especially the latter.

It has now been found that by adding diethylenetriamine to a starting mixture of ethylene dichloride and ammonia such as has heretofore been employed for the production of a mixture of ethylene polyamines, and reacting the mixture, the formation of diethylenetriamine can be rendered less extensive, or eliminated, and the yield of higher polyethylene polyamines be increased. The diethylenetriamine which is fed to the reaction may be obtained from any source and may be recycled in the process.

The employment of diethylenetriamine in the starting mixture not only reduces, or eliminates, formation of the same, but has other desirable effects, e. g. of reducing the overall reaction time usually involved in a direct reaction between ammonia and ethylene dichloride and of causing the reaction for formation of the ethylene polyamines to occur more readily than occurs when employing ammonia and ethylene dichloride as the only reactive starting materials.

The extent to which formation of diethylenetriamine is curtailed and the yield of higher polyethylene polyamines is increased varies with change in the proportion of diethylenetriamine employed in the starting mixture. The presence of about 0.3 to 0.4 molecular equivalent of diethylenetriamine per mole of ethylene dichloride in the feed mixture is usually sufficient to prevent formation in the reaction of a further amount of diethylenetriamine and smaller proportions of diethylenetriamine can be used in the feed mixture to curtail formation of a further amount of the compound. When the starting mixture contains a greater proportion of diethylenetriamine than is required to prevent formation of the same, part of the diethylenetriamine is consumed in forming higher polyethylene polyamines. The remaining diethylenetriamine can be separated from the reaction products and be re-employed in the process.

The diethylenetriamine starting material may be employed in any desired proportion. It is usually employed in amount corresponding to at least 0.05 mole of the diethylenetriamine per mole of the ethylene dichloride. The reaction may be carried out employing up to 10 molar proportions of the diethylenetriamine per mole of the ethylene dichloride in the starting mixture, but is usually carried out using a starting mixture that contains from 0.05 to 2, preferably from 0.1 to 1, mole of diethylenetriamine per mole of ethylene dichloride.

The ammonia is usually employed as an aqueous solution containing at least 28, preferably from 28 to 60, percent by weight of the ammonia. The solution of the ammonia is usually employed in amount corresponding to at least 5, preferably from 5 to 15, moles or more of the ammonia per mole of the ethylene dichloride starting material.

In practice ethylene dichloride and an aqueous solution of ammonia, preferably containing from 28 to 60 percent by weight of ammonia, are fed to a reaction zone in proportions corresponding to at least 5, preferably from 5 to 15, moles of the ammonia per mole of the ethylene dichloride, together with diethylenetriamine in amount corresponding to at least 0.05 mole of the diethylenetriamine per mole of the ethylene dichloride. The liquid mixture of the ingredients is maintained in intimate contact with one another under pressure in the reaction zone at temperatures between 140° and 250° C., preferably from 180° to 220° C., to effect reaction of the ethylene dichloride and the ammonia, together with the diethylenetriamine. The liquid mixture of ingredients is usually heated at a reaction temperature under a pressure of at least 1500, preferably from 1800 to 3000, pounds per square inch, and for a time of 15 minutes or less, preferably not more than 20 seconds. It is important that the reactants be intimately dispersed or contacted with one another in the liquid mixture in order to obtain a rapid and complete reaction. This can be accomplished in usual ways, e. g. by agitating the materials or by passing a mixture of the ingredients through a reaction vessel comprising a pipe or tubular coil at a rate such as to cause turbulent flow of the mixture therein. The reacted mixture is usually cooled and discharged from the reactor into a vessel at a lower pressure. The reacted mixture is neutralized with an alkali, e. g. by adding an aqueous solution containing 20 percent by weight or more of potassium hydroxide, or sodium hydroxide, suitably the latter, thereto. The reacted mixture is usually mixed with at least 2 moles, preferably 2.2 moles or more, of the alkali per mole of the ethylene dichloride fed to the reaction, after which ammonia, together with traces of by-product vinyl chloride, and the ethylene polyamines are separated from the alkaline mixture and from one another in usual ways, e. g. by distillation. Excess ammonia can be separated from the reacted mixture prior to neutralization of the same with an alkali metal hydroxide, if desired. The ammonia and the ethylene polyamines, liberated by neutralizing the reacted mixture, are separated from the action in each of the experiments. The table also gives the yields in percent by weight of the products which were formed in the reaction in each of the experiments.

Table

| Run No. | Starting Materials | | | Products | | | | |
|---|---|---|---|---|---|---|---|---|
| | Ethylene Dichloride, Mole | Ammonia, Moles | Diethylene Triamine, Mole | Ethylene Diamine, Percent | Diethylene Triamine, Percent | Triethylene Tetramine, Percent | Tetraethylene Pentamine, Percent | Vinyl Chloride, Percent |
| 1 | 1 | 6.5 | 0 | 51.7 | 24.8 | 12.0 | 8.2 | 3.3 |
| 2 | 1 | 6.4 | 0.115 | 47.5 | 10.0 | 19.5 | 19.4 | 3.6 |
| 3 | 1 | 5.7 | 0.495 | 30.6 | 0 | 30.5 | 31.9 | 7.0 | residue and from one another in usual ways, e. g. by distillation. The recovered ammonia can be reused in the process. The recovered diethylenetriamine can be recycled, in whole, or in part, to the reaction, i. e. it can be fed to the reaction in admixture with ammonia and ethylene dichloride in proportions as hereinbefore mentioned and employed to form higher polyethylene polyamines such as triethylenetetramine or tetraethylenepentamine.

The invention provides a method for readily making higher polyethylene polyamines in good yield from ethylene dichloride and ammonia and permits diethylenetriamine to be recycled, or consumed, in the reaction for the production of higher polyethylene polyamines.

The following example illustrates a way in which the principle of the invention has been applied, but is not to be construed as limiting its scope.

EXAMPLE

In each of the series of experiments, ethylene dichloride and an aqueous 35 weight percent ammonia solution, together with diethylenetriamine, were fed into admixture with one another at a temperature of 150° C. in a tubular reaction vessel substantially filled with the liquid reacted starting materials under pressure, in proportions as stated in the following table. The liquid mixture of starting materials, under a pressure of approximately 2000 pounds per square inch gauge pressure, was passed through the tubular vessel, wherein it was maintained at a temperature between 150° and 225° C. for a reaction time of approximately 11 seconds, then cooled and discharged into a receiving vessel at a lower pressure. By reaction time is meant the time required for an infinitesimal portion of the liquid mixture of ingredients to pass through the heated tubular reactor. An aliquot portion of the cooled reacted mixture was collected. The ammonia, together with a small proportion of by-product vinyl chloride, was distilled and separated therefrom. Thereafter, the main body of the aliquot portion was made alkaline with an aqueous 50 percent by weight sodium hydroxide solution. The alkaline mixture was heated to steam distill and separate the ethylene polyamines, together with water, from the residue. The ethylene polyamines were separated from one another by fractional distillation. The residue boiling at temperatures above 110° C. at 0.5 millimeter absolute pressure was principally tetraethylenepentamine. The table gives the relative proportions of the ethylene dichloride, ammonia (in the aqueous 35 weight percent solution) and diethylenetriamine starting materials fed to the re-

We claim:

1. In a process for making an ethylene polyamine wherein a liquid mixture of ethylene dichloride and an aqueous solution of ammonia is reacted by heating the same to a reaction temperature under pressure, the step which consists in feeding to the reaction at least 0.05 mole of diethylenetriamine per mole of the ethylene dichloride starting material.

2. A process as claimed in claim 1, wherein the ammonia is employed in an aqueous solution containing at least 28 percent by weight of said ammonia and in amount corresponding to at least 5 moles of the ammonia per mole of the ethylene dichloride starting material.

3. In a process for making ethylene polyamines, including diethylenetriamine, by reacting ethylene dichloride with ammonia, wherein ethylene dichloride and an aqueous solution of from 28 to 60 percent by weight of ammonia are fed into admixture with one another in proportions corresponding to at least 5 gram molecular proportions of the ammonia per gram molecular proportion of the ethylene dichloride in a reaction zone wherein a liquid mixture of the reactants is heated at reaction temperatures between 140° and 225° C. under a pressure of at least 1500 pounds per square inch until the reaction is substantially complete and the reacted mixture is thereafter withdrawn from said reaction zone, the step which consists in feeding to the reaction at least 0.05 gram molecular proportion of diethylenetriamine per gram molecular proportion of the ethylene dichloride.

4. A process as claimed in claim 3, wherein the reacted mixture withdrawn from the reaction zone is neutralized by mixing therewith from 2 to 2.2 gram molecular proportions of sodium hydroxide per gram molecular proportion of the ethylene dichloride fed to the reaction and thereafter separating the ethylene polyamines from the neutralized mixture.

5. A process as claimed in claim 4, wherein the ethylene polyamines including diethylenetriamine, are separated from one another by distillation and at least a portion of the diethylenetriamine is returned to the reaction.

References Cited in the file of this patent

UNITED STATES PATENTS

| | | |
|---|---|---|
| 2,049,467 | Mnookin | Aug. 4, 1936 |
| 2,085,785 | Bottoms | July 6, 1937 |
| 2,098,289 | Greenewalt | Nov. 9, 1937 |
| 2,279,294 | Hardman | Apr. 14, 1942 |